J. McMAHON.
REVERSING MECHANISM.
APPLICATION FILED AUG. 19, 1907.
903,222.
Patented Nov. 10, 1908.
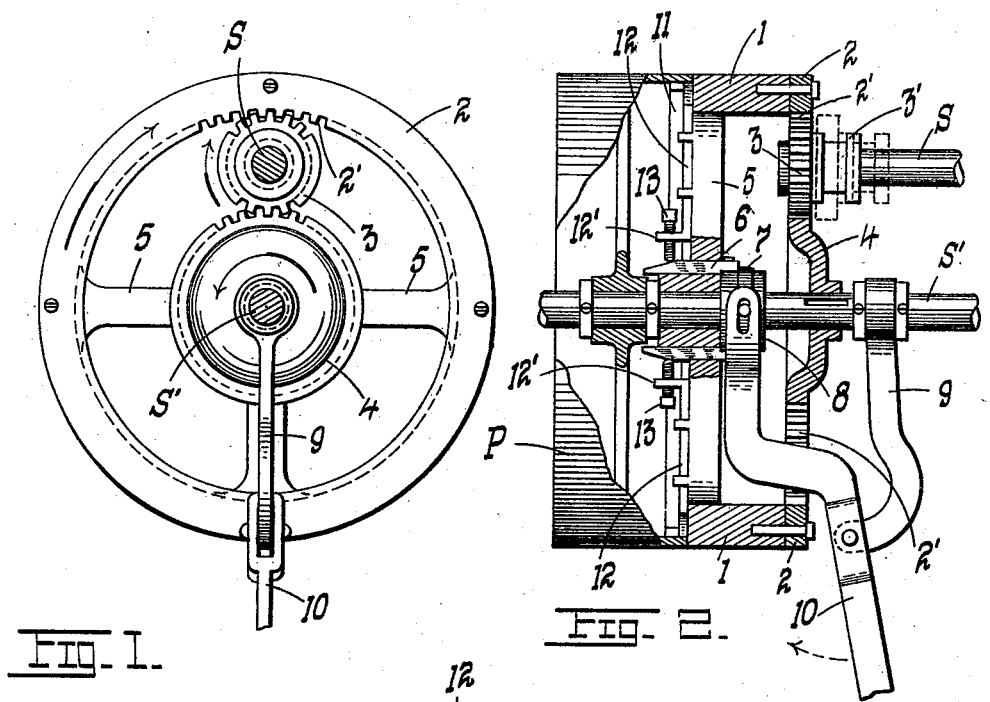
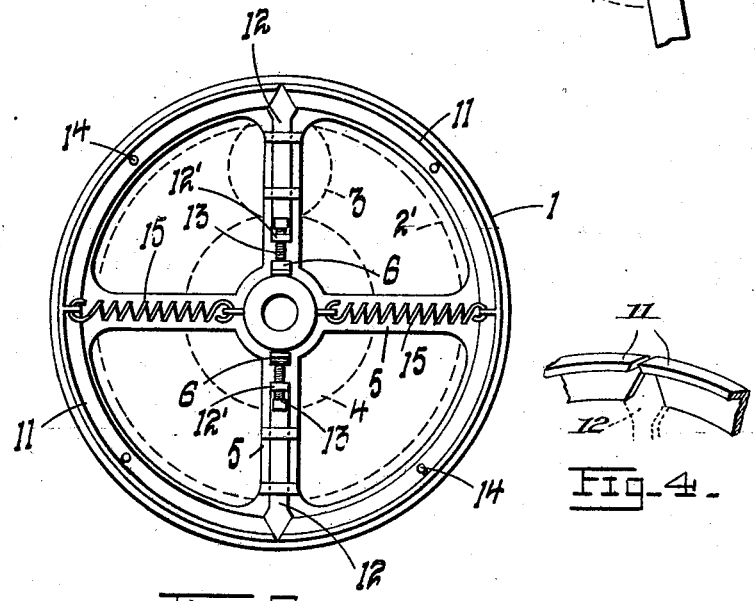
WITNESSES:
INVENTOR.
Joseph McMahon
BY
ATTORNEY.

UNITED STATES PATENT OFFICE.

JOSEPH McMAHON, OF ST. LOUIS, MISSOURI.

REVERSING MECHANISM.

No. 903,222.　　　　Specification of Letters Patent.　　Patented Nov. 10, 1908.

Application filed August 19, 1907.　Serial No. 389,176.

*To all whom it may concern:*

Be it known that I, JOSEPH MCMAHON, citizen of the United States, residing at St. Louis, State of Missouri, have invented certain new and useful Improvements in Reversing Mechanism, of which the following is a full, clear, and exact description, reference being had to the accompanying drawings, forming a part hereof.

My invention has relation to improvements in gearing for reversing mechanism; and it consists in the novel construction and arrangement of parts more fully set forth in the specification and pointed out in the claims.

In the drawings, Figure 1 is a view of one end of the clutch-pulley, the drive-shaft being in cross section; Fig. 2 is a combined longitudinal section and elevation of the driving pulley and clutch-pulley; Fig. 3 is a view of the opposite end of the clutch-pulley, the driving pulley being removed; and Fig. 4 is a perspective showing in detail the construction of the split ring which engages the band of the pulley.

My invention has for its object to provide a clutch-gear which will permit a rotation of the drive-shaft in a direction reverse to that of the rotation of the drive-pulley, the invention being specially applicable to lathes and similar classes of machines, where occasions arise to utilize such reverse rotation.

A further object is to simplify the details of the mechanism, the advantages of which will be better apparent from a description of the invention which is as follows:

Referring to the drawings, S′ represents the main drive-shaft on which is loosely mounted the main drive or belt-pulley P operated by a belt (not shown) from any suitable source of power. It is kept in position against longitudinal displacement on the shaft in any well known mechanical manner. Mounted loosely on the shaft S′ adjacent to the pulley P is a clutch pulley 1, provided at one end with a ring or band 2, having inner gear teeth 2′ with which meshes an adjustable pinion 3 mounted at the end of a shaft S, of any convenient length. The mechanism or shifter for shifting the pinion along the shaft with a view of disengaging the pinion from the gear teeth 2′ is not shown as that may be of any design or construction. The hub of the pinion 3 terminates in a collar 3′ between which and the base of the pinion a suitable shifter (not shown) may engage, but such shifter is not shown as it may be of any well known and ordinary construction. Keyed to the shaft S′ is an exteriorly geared disk 4 which transmits motion to the shaft from the clutch pulley 1.

The pulley 1 is provided with spokes or radial arms 5, at the bases of which, and through the hub of the pulley operate freely the blocks 6 having wedge-shaped or beveled terminals, the blocks being secured to a sliding collar 8 mounted on the shaft S′, said collar being provided with a band 7 to which is coupled by a pin and slot connection the end of the short arm of a shifting lever 10, pivotally coupled at the end of a fulcrum arm 9 loosely coupled on the shaft S′. Adapted to slide along two diametrically disposed arms 5, in suitable bearings are arms 12 having outer wedge-shaped or tapering ends which engage corresponding bevel ends of the semi circular sections 11 of a split clutch-band or ring having a flanged portion confined within the rim of the pulley P, the base of the ring (or ring proper) resting against the adjacent face of the rim of the pulley 1, and loosely coupled thereto by pins 14 passing through suitable enlarged slots formed in said ring. The inner adjacent ends of the radial arms 12 are provided with lugs or brackets 12′ which carry adjusting screws 13, the inner ends of the screws bearing against the bevel ends of the blocks 6.

The operation of the clutch is as follows: The operator swings the lever 10 to the right in Fig. 2, so as to oscillate the short arm connected to the band 7 to the left. This will force the blocks 6 in proper direction to cause the beveled ends of such blocks to force the arms 12 radially outwardly. In such movement, the wedge shaped ends of the arms 12 will force the sections 11 of the clutch band into frictional contact with the pulley P (rotating constantly in one direction), thereby coupling the clutch-pulley 1 thereto, when both pulleys will rotate as a unit in the same direction about the shaft S′. The gearing 2′, 3, and 4 will thus impart a rotation to the shaft S′ in a contrary direction as shown by the arrows in Fig. 1, it being understood that the disk 4 is keyed to said shaft. By swinging the lever 2 in the opposite direction (see dotted arrow in Fig. 2) the blocks 6 will be retracted from the screws 13, thus loosening the contact between them, whereupon the wedge-shaped arms 12 will move toward the axis of the shaft, allowing the band sections 11 to release their frictional hold on the rim of the driving pulley P, this action being accelerated by the retracting springs 15, having their opposite ends respectively coupled to the band sections 11 and to the hub of the pulley 1. When thus released the shaft S′ will come to a stop until again started by the main and direct driving clutch (not shown) on the opposite side of the pulley P. By adjusting the screws 13 to and from the bevel ends of the blocks 6, a variable frictional contact may be effected between the clutch band 11 and pulley P, and slipping between the latter pulley and clutch-pulley 1 may be avoided.

Having described my invention what I claim is:

1. In combination with a drive-shaft, a rotatable drive pulley mounted loosely thereon, a clutch pulley mounted loosely on the shaft adjacent the drive pulley, a sectional clutch-band on the clutch-pulley engaging the rim of the drive-pulley, means on the clutch-pulley for forcing the band into positive frictional contact with the driving pulley, an interior toothed gear on the clutch pulley, and intermediate reversing gearing between the said toothed gear and shaft, substantially as set forth.

2. In combination with a drive-shaft, a rotatable driving pulley mounted loosely thereon, a clutch pulley loose on the shaft adjacent to the driving pulley, a sectional clutch-band on the clutch pulley having a flange disposed inside the rim of the driving pulley, radially disposed movable arms on the clutch pulley having outer wedge-shaped terminals located between the sections of the clutch-band, blocks on the clutch pulley disposed about the axis of the latter and having beveled portions engaging the inner ends of the radial arms aforesaid, means for shifting the blocks against the arms and forcing them radially outward whereby the clutch-band sections are forced into frictional engagement with the rim of the driving-pulley and both pulleys revolve as a unit, and intermediate reversing gearing between the clutch-pulley and shaft, substantially as set forth.

3. In combination with a drive-shaft, a rotatable driving pulley mounted loosely on the shaft, a clutch-pulley adjacent to the driving pulley, a sectional clutch-band yieldingly mounted on the clutch-pulley and having a flange disposed inside the rim of the driving pulley, radially disposed movable arms on the clutch-pulley having outer beveled ends confined between corresponding beveled ends of the clutch-band sections, sliding blocks disposed about the axis of the clutch-pulley having beveled ends, adjusting screws carried by the inner ends of the radial arms aforesaid and engaging the beveled surfaces of the blocks, retracting springs connecting the clutch-band sections with the body of the clutch-pulley, a fulcrum arm loosely secured to the drive-shaft, a shifting lever pivoted to said arm and having one end coupled to the blocks aforesaid, an interior toothed gear on the clutch-pulley, a gear wheel or disk keyed to the drive-shaft, and an intermediate pinion meshing with said interior gear and gear disk, the parts operating substantially as, and for the purpose set forth.

In testimony whereof I affix my signature, in presence of two witnesses.

JOSEPH McMAHON.

Witnesses:
EMIL STAREK.
JOS. A. MICHEL.